(12) United States Patent
Moon et al.

(10) Patent No.: US 6,195,686 B1
(45) Date of Patent: Feb. 27, 2001

(54) MESSAGING APPLICATION HAVING A PLURALITY OF INTERFACING CAPABILITIES

(75) Inventors: Billy G. Moon, Apex; Brian Bankler, Cary; Tammy A. Wooldridge, Raleigh; Manon A. Baratt, Cary, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/940,138

(22) Filed: Sep. 29, 1997

(51) Int. Cl.[7] ............................................. G06F 15/16
(52) U.S. Cl. .................... 709/206; 709/200; 709/207; 709/218; 709/245
(58) Field of Search ................................. 709/206, 218, 709/245, 200, 207; 707/10, 206, 218, 245; 358/400; 455/412, 461

(56) References Cited

U.S. PATENT DOCUMENTS

| | | | |
|---|---|---|---|
| 5,278,955 | * 1/1994 | Forte et al. | 709/206 |
| 5,479,472 | * 12/1995 | Campana et al. | 455/412 |
| 5,706,434 | * 1/1998 | Kremen et al. | 709/218 |
| 5,742,905 | * 4/1998 | Pepe et al. | 455/461 |
| 5,752,059 | * 5/1998 | Holleran et al. | 709/245 |
| 5,754,306 | * 5/1998 | Taylor et al. | 358/400 |
| 5,781,902 | * 7/1998 | Waskiewicz | 707/10 |
| 5,822,526 | * 10/1998 | Waskiewicz | 709/206 |
| 5,826,269 | * 10/1998 | Hussey | 707/10 |

FOREIGN PATENT DOCUMENTS

0646857 A1 * 5/1995 (EP) .

OTHER PUBLICATIONS

"E–Mail Connection 2.0 Speeds Up and Smoothes Out", PC Magazine, May 31, 1994.*
Window Magazine, The E–Mail maze, 1993.*
PR NewsWire, ConnectSoft Ships Email Connection, Oct., 1996.*
InfoWorld, Windows gets smart in preparing for the wireless revolution, Dec., 1993.*

(List continued on next page.)

Primary Examiner—Zarni Maung
Assistant Examiner—Nabil El-Hady
(74) Attorney, Agent, or Firm—Wood, Phillips, VanSanten, Clark & Mortimer

(57) ABSTRACT

A messaging application is provided for use in a user communications device having a processor controlling a display and a user input device, and a communications terminal for transmitting and receiving a plurality of different types of electronic messages. The messaging application includes a mail provider program operated by the processor. The mail provider program includes a mail provider module for automatically controlling the transmittal and/or receipt of electronic messages by a user accessing the display and the user input device, a mail source module operatively associated with the mail provider module for receiving of electronic messages including a plurality of mail source protocols each associated with a different mail service provider, and a mail sink module operatively associated with the mail provider module for transmitting of electronic messages including a plurality of mail sink protocols each associated with a different mail service provider. The mail source module selecting one of the mail source protocols for controlling the receipt of incoming electronic mail messages to the mail provider module based on the mail service provider from which the electronic message is received. The mail sink module selecting one of the mail sink protocols for controlling the transmission of the outgoing electronic message from the mail provider module based on select criteria.

20 Claims, 6 Drawing Sheets

OTHER PUBLICATIONS

Patel, A. et al.: "A technique for multi–network access to multimedia messages" Computer Communications, vol. 20, No. 5, Jul. 5, 1997, pp. 324–337.

Dack, D. et al.: "A simple, inexpensive communications interface for PDAs and Portable PCs" Annual Review of Communications, vol. 48, Jan. 1, 1994, pp. 692–699.

* cited by examiner

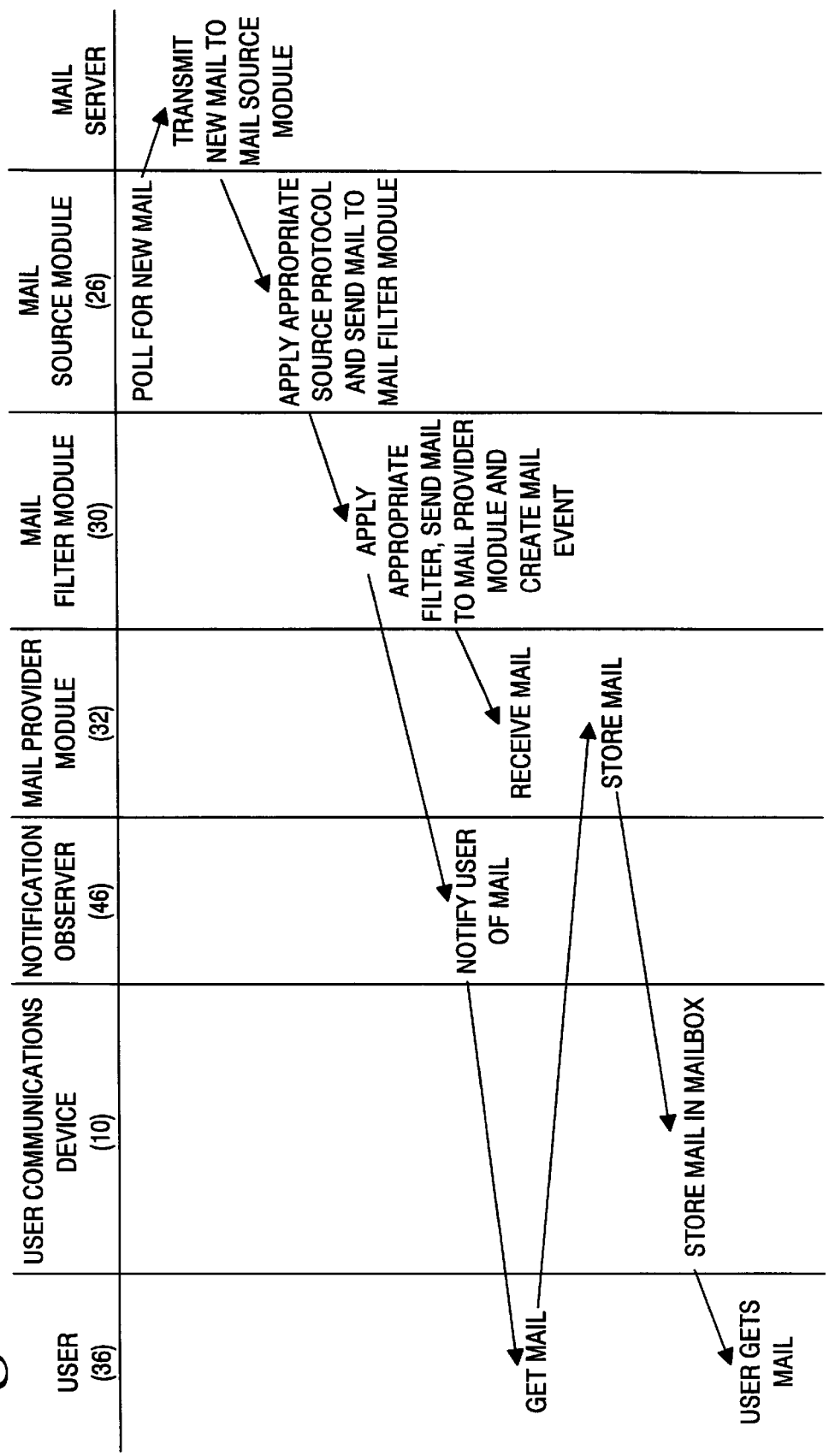

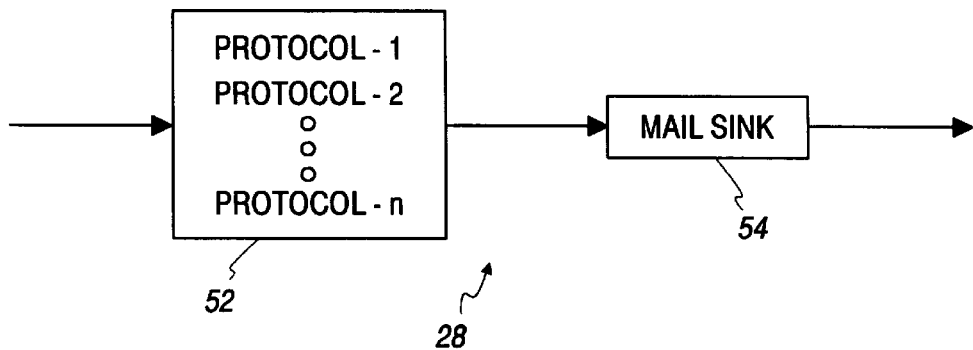
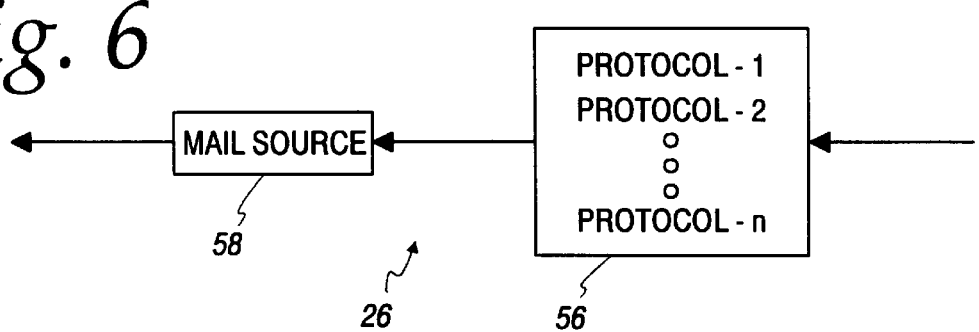
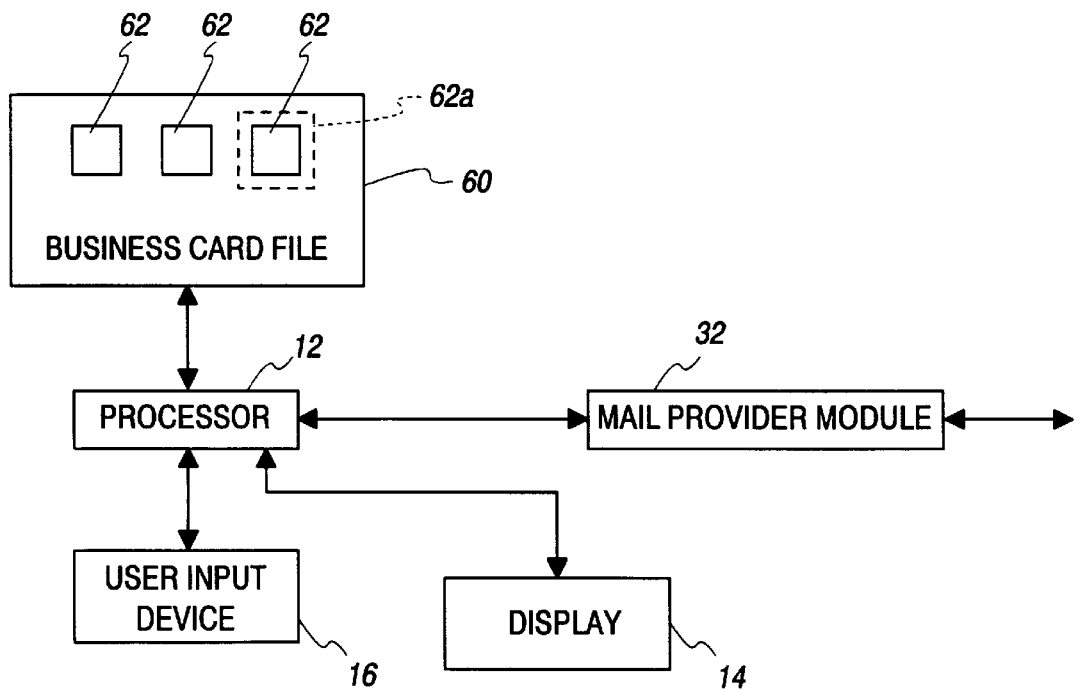

MESSAGING APPLICATION HAVING A PLURALITY OF INTERFACING CAPABILITIES

FIELD OF THE INVENTION

The present invention is directed toward electronic mail resources and, more particularly, to a messaging application for transmitting and receiving electronic mail items in various formats.

BACKGROUND OF THE INVENTION

In today's business world, communications via electronic mail resources, such as E-mail, fax mail, voice mail, etc., are becoming increasingly popular. As a result, various communications companies have seen a growing market in this industry and have set up systems for the transmission of electronic mail items. Such companies will hereinafter be referred to as "mail service providers".

Generally, a user opens up an account with the mail service provider(s) of his/her choice. The user then receives software from the mail service provider which the user must load on his/her computer in order for the computer to interface, i.e., receive and transmit electronic mail items, with the mail server utilized by the mail service provider. The user also receives an address or "mailbox" within the mail service provider's network at which electronic mail items addressed to the user are received and stored.

When a user wishes to send an E-mail message, the user must access the appropriate mail service provider software. The user can then send the message to a desired destination via the selected mail service provider network. If the user has more than one mail service provider account, the user must manually choose which mail service provider to use for transmitting the E-mail message.

Since there are numerous mail service providers in the marketplace today, various discounts may be offered in order to attract business. A user manually choosing a first mail service provider to transmit an E-mail message may be unaware that a second or third mail service provider is offering a drastically reduced rate at that particular time. Further, the user may also be unaware that the mail service provider is experiencing a high volume of traffic which may delay the E-mail transmission.

In receiving E-mail messages, a user must log onto the appropriate mail service provider and check the mailbox provided to the user by the particular mail service provider. The user can then retrieve the message from the mailbox and view the message. If the user has more than one mail service provider account, the user must manually access each mailbox provided by each mail service provider. This is time consuming in that the user has to log onto each particular mail service provider in order to interface with the mailbox provided by the particular mail service provider.

The present invention is directed toward overcoming one or more of the above-mentioned problems.

SUMMARY OF THE INVENTION

A messaging application is provided for use in a user communications device having a processor controlling a display and a user input device, and a communications terminal for transmitting and receiving a plurality of different types of electronic messages. The messaging application includes a mail provider program operated by the processor. A mail provider module automatically controls the transmittal and/or receipt of electronic messages by a user accessing the display and user input device. A mail source module is operatively associated with the mail provider module for receiving of electronic messages including a plurality of mail source protocols each associated with a different mail service provider. A mail sink module is operatively associated with the mail provider module for transmitting of electronic messages including a plurality of mail sink protocols each associated with a different mail service provider. The mail source module selects one of the mail source protocols for controlling the receipt of incoming electronic mail messages to the mail provider module based on which of the mail service providers from which the electronic message is received. The mail sink module selects one of the mail sink protocols for controlling the transmission of the outgoing electronic message from the mail provider module based on select criteria.

In another aspect of the present invention, the mail source module includes a mail source operatively associated with the mail provider module, and a mail source protocol handler operatively associated with the mail source for receiving of electronic messages including a plurality of mail source protocols each associated with a different mail service provider. The mail source protocol handler selects one of the mail source protocols for controlling the receipt of incoming electronic mail messages to the mail provider module via the mail source based on which of the mail service providers from which the message is received.

In another aspect of the present invention, the mail sink module includes a mail sink protocol handler operatively associated with the mail provider module for transmitting of electronic messages including a plurality of mail sink protocols each associated with a different mail service provider. The mail sink protocol handler selects one of the mail sink protocols for controlling the transmission of outgoing electronic mail messages from the mail provider module based on select criteria. A mail sink operatively associated with the mail sink protocol handler receives the outgoing electronic mail message with the selected mail sink protocol and transmits the outgoing electronic mail message to a predetermined address via the mail service provider associated with the selected mail sink protocol.

In another aspect of the present invention, the mail sink module transmits the outgoing electronic mail message to the predetermined address via the mail service provider network and transmits a notification signal to the display of the user communications device notifying a user that the outgoing electronic mail message has been transmitted.

In another aspect of the present invention, the mail source module transmits the incoming electronic mail message to the processor via the mail provider module and transmits a notification signal to the user communications device notifying a user than an incoming electronic mail message has been received.

In another aspect of the present invention, the mail provider program further includes a mail filter module operatively associated with the mail provider module including a plurality of different types of mail filters, wherein the mail filter module selects one of the mail filters for applying to the outgoing or incoming electronic mail message based on the type of outgoing or incoming electronic mail message.

In another aspect of the present invention, a business card agent associated with an assigned address in the processor is applied to the outgoing or incoming electronic mail message.

In still another aspect of the present invention, the assigned address includes an address accessed via a business card stored in the processor, wherein the business card agent is previously stored in the mail filter module upon receipt of the business card including the business card agent by the user communications device.

In yet another aspect of the present invention, the business card agent includes a filter.

It is an object of the present invention to provide a user communications device with the capability of interfacing with a plurality of mail servers utilized by different mail service providers during the receipt and transmission of electronic mail resource messages.

It is a further object of the present invention to automatically provide the user communications device with the "best" mail service provider for transmitting an electronic mail resource message.

It is yet a further object of the present invention to provide the user communications device with the ability to receive and send business cards including business card agents.

Other aspects, objects and advantages of the present invention can be obtained from a study of the application, the drawings, and the appended claims.

BRIEF DESCRIPTION OF THE DRAWINGS

FIG. 4 is a process flow diagram illustrating the method by which the mail provider program receives electronic mail resources at the user communications device;

FIG. 5 is a block diagram of the mail sink module included in the mail provider program of the present invention;

FIG. 6 is a block diagram of the mail source module included in the mail provider program of the present invention;

FIG. 7 is a block diagram of the user communications device including a business card file for storing electronic business cards;

DETAILED DESCRIPTION OF THE PREFERRED EMBODIMENT

Figure 1:
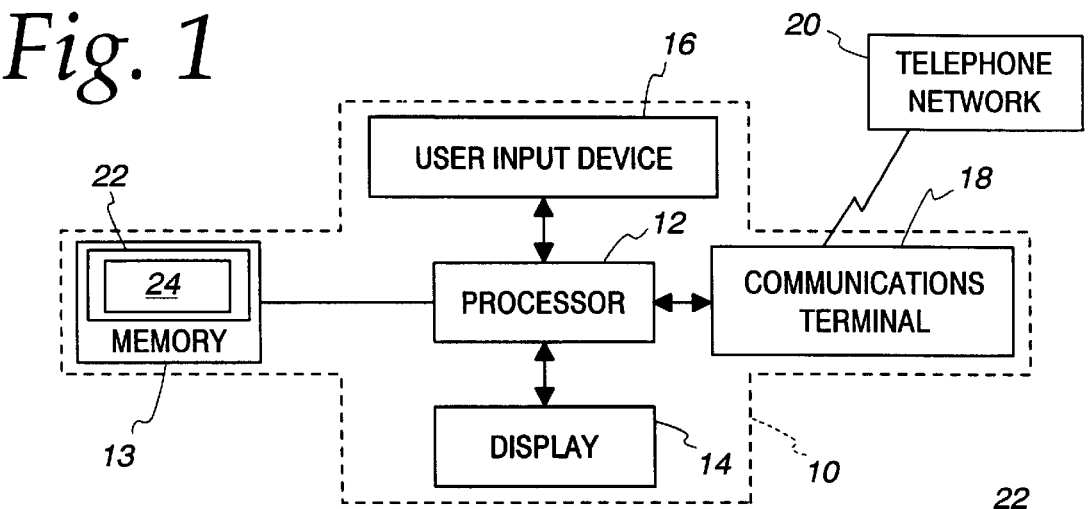
FIG. 1 is a block diagram of a user communications device operating a messaging application including a mail provider program of the present invention.

A user intelligent communications device is depicted generally at 10 in FIG. 1. The user communications device 10 includes a processor 12, accessing a memory 13, with the processor 12 controlling a display 14 and a user input device 16. The user communications device 10 also includes a communications terminal 18 for communicating externally, such as for transmitting and receiving different types of electronic mail messages via a telephone network 20. The communications terminal 18 may be cellular, PSTN or IRDA depending upon the mode of communication required by a user. Accordingly, the telephone network 20 may be a cellular network, PSTN or IRDA network.

A messaging application referenced at 22 is stored in the memory 13. The messaging application 22 is accessible by a user of the user communications device 10 to effectuate the receipt and/or transmission of various types of electronic mail messages by and/or from the user communications device 10. The messaging application 22 provides interfacing capabilities with various mail servers utilized by various mail service providers to permit the receipt/transmission of electronic mail messages by the user communications device 10.

The messaging application 22 includes a mail provider program referenced at 24 providing the user communications device 10 with single user interface capabilities for multiple mail servers. More specifically, the mail provider program 24 provides a user the flexibility of transmitting and receiving various types of electronic mail resources through various mail service providers without having to manually log onto each individual mail service provider.

Figure 2:
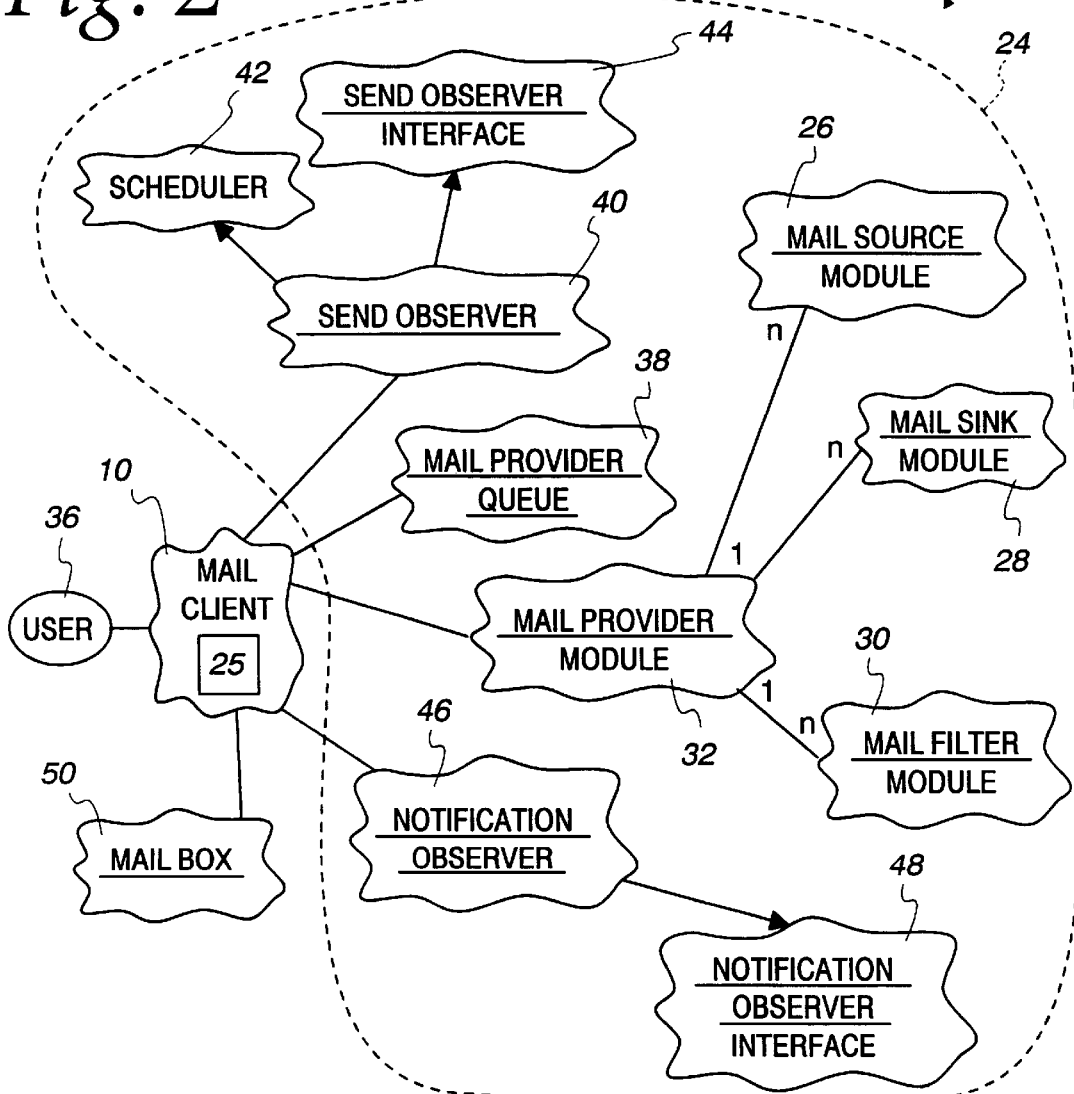
FIG. 2 is a block diagram illustrating the messaging application.

Referring to FIG. 2, the messaging application 22 is illustrated in greater detail. Particularly, the user communication device 10, referred to as a "mail client", includes a user interface 25 and is operated by a user 36. The user 36 has a mailbox 50 for storing electronic mail.

The mail provider program 24 may be written in Java and includes numerous modules functionally interconnected, as described, to implement the features of the messaging application 22 relating to transmitting and receiving mail. The mail provider program 24 includes a mail provider module 32 operatively associated with the user interface 25 for automatically controlling the transmittal and/or receipt of electronic messages by a user 36 accessing the display 14 and user input delay 16. A mail source module 26 is operatively associated with the mail provider module 32 for receiving of electronic mail messages. A mail sink module 28 is operatively associated with the mail provider module 32 for transmitting of electronic mail messages. A mail filter module 30 is functionally connected to the mail provider module 32 for providing appropriate filters to received mail or mail to be transmitted. Each of the modules 26, 28 and 30 is connected to external electronic mail resource networks via the communications terminal 18 and telephone network 20, see FIG. 1.

The user 36, via the user input device 16 and display 14, generates a mail parcel at the user communications device 10 and enters a command to "send mail", which transmits the mail parcel to a mail provider queue 38. The user communications device 10 also notifies the send observer 40 that a mail parcel is being sent. Upon such notification, the send observer 40 creates and adds a mail event to a scheduler 42, the send observer 40 essentially being the watchdog to make sure all outgoing mail parcels are transmitted.

When the mail parcel reaches the beginning of the queue, the mail provider module 32 passes the outgoing mail parcel to the mail sink module 28. The mail sink module 28 includes a plurality of sink protocols (protocol-1–protocol-n), with each sink protocol relating to a different mail server or mail service provider. Such sink protocols may include, but are not limited to, SMS and SMTP protocols.

Based upon various select criteria, the mail sink module 28 chooses the appropriate sink protocol for the outgoing mail parcel, applies it to the outgoing mail parcel and transmits the mail parcel to the selected mail server of the selected mail service provider in the external electronic mail resource network via the communications terminal 18 and telephone network 20.

Selection of a sink protocol for the outgoing mail parcel may occur in one of three ways. First, a user may select the mail service provider to use to transmit the mail parcel. The mail sink module 28 applies the appropriate sink protocol for the selected mail service provider to the mail parcel and transmits the mail parcel.

Second, a user may allow the mail provider program 24 to automatically choose an appropriate mail service provider. The mail provider program 24 negotiates with the various mail service providers with which the user has an account, and chooses the "best" one for transmitting the mail parcel. In deciding which mail service provider is "best" at that particular time, the mail provider program 24 looks at various select criteria such as, but not limited to, the type of mail parcel being sent, the availability of each mail service provider, the traffic on the mail service provider's network at that particular time, and the cost of sending the mail parcel.

The third option is to have the mail provider program 24 look at the same select criteria as mentioned above, but prior to transmitting the outgoing mail parcel, allowing the user to view the various options via the display 14 and authorize the transmission. Since most business people have at least two mail service provider accounts, the mail provider program 24 of the present invention is particularly useful as it will analyze each mail service provider and determine the "best" one available to transmit the outgoing mail parcel.

After transmission of the outgoing mail parcel, the mail sink module 28 passes a notification signal to the send observer 40 that the mail parcel has been transmitted. The send observer 40, in turn, deletes the mail event from the scheduler 42, and notifies the user 36 via a send observer interface 44 that the mail parcel has been transmitted.

Referring now to FIGS. 2 and 4, the receipt of electronic mail resources by the mail provider program 24 is as follows. The user communications device 10 may be conventionally programmed to periodically poll the mail servers of the mail service providers with which the user 36 has an account for new mail. Accordingly, the mail source module 26 polls the mail server of each mail service provider with which the user 36 has an account for new mail. If new mail destined to the user 36 has been received at the mail server, the mail source module 26 retrieves the new mail from the mail server. The mail source module 26 includes a plurality of mail source protocols (protocol-1–protocol-n), with each source protocol relating to a different mail server or mail service provider. Such source protocols may include, but are not limited to FAX, ITAP, POP3, SMS and SMTP protocols.

The mail source module 26 analyzes the incoming mail and determines the appropriate source protocol to apply based on the mail service provider from which the message was received. The mail source module 26 applies the appropriate source protocol permitting the user communications device 10 to interface with the mail server from which the mail parcel was retrieved. The mail source module 26 then sends the mail parcel to the mail filter module 30.

The mail filter module 30 determines which, if any, filter should be applied to the incoming mail parcel. The mail filter module 30 applies the appropriate filter, sends the mail parcel to the mail provider module 32 for temporary storage and creates a mail event to notify the notification observer 46 of new mail. The various filter applied by the mail filter module 32 include, but are in no way meant to be limited to, encryption, decryption and auto-forwarding.

The notification observer 46 provides a notice via a notification interface 48 to the user 36 that new mail has been received by the user communications device 10. The user 36, upon receiving such notification, enters a command to "retrieve mail". The mail provider module 32, upon receiving this command, stores the mail in the mailbox 50 to be accessible by the user 36.

The mail provider program 24 of the present invention is particularly useful for persons having at least two mail service provider accounts. The mail provider program 24 obviates the necessity of accessing and checking each mail server of each individual mail service provider account for received electronic mail resources. The mail provider program 24, in retrieving mail, checks the mail server of each mail service provider account for mail parcels and applies the appropriate source protocol allowing the user communications device 10 to interface with the mail server from which the mail parcel was retrieved.

Further, with the mail provider program 24, a user does not have to think about which mail service provider to use when transmitting mail. The mail provider program 24 negotiates with each mail service provider with which the user has an account and is capable of automatically choosing the "best" mail service provider to use at that particular time for transmitting the outgoing mail parcel. The mail provider program 24 applies the appropriate sink protocol to the outgoing mail parcel, allowing the user communications device 10 to interface with the mail server to which the mail parcel is transmitted.

As shown in FIG. 5, the mail sink module 28 may include a mail sink protocol handler 52 operatively associated with a mail sink 54. The mail sink protocol handler 52 includes the plurality of mail sink protocols (protocol-1–protocol-n), each corresponding to a different mail service provider. The particular protocol for any mail service provider is designated by that provider. Based on the type of mail parcel being transmitted, the mail sink protocol handler 52 negotiates with the various mail service providers with which the user has an account. The mail sink protocol handler 52 chooses an appropriate mail service provider considering the same criteria as previously indicated, and applies the selected sink protocol to the outgoing mail. The outgoing mail is sent to the mail sink 54 which transmits the outgoing mail to the selected mail service provider network.

As shown in FIG. 6, the mail source module 26 may include a mail source protocol handler 56 operatively associated with a mail source 58. Retrieved mail is received by the mail source protocol handler 56 which includes the plurality of mail source protocols (protocol-1–protocol-n), each corresponding to a different mail service provider. Depending on the type of mail received and the mail service provider from which it was received, the mail source protocol handler 56 applies the appropriate source protocol and sends the mail parcel to the mail source 58. The mail source 58 transmits the incoming mail parcel to the mail provider module 32 where it can be accessed and viewed by the user 36 of the user communications device 10.

The present invention has particular utility when the user 36 of the user communications device 10 is utilizing electronic business cards to receive or transmit mail. An electronic business card includes all of the information on the standard paper business cards used today, and is stored at an appropriate location or directory within the user communications device 10. In addition to providing general information such as person name, company name, position, business address, work phone number, work fax number, E-mail address, etc., electronic business cards may also include other personal or business information and a greeting, if so desired.

Figure 3:
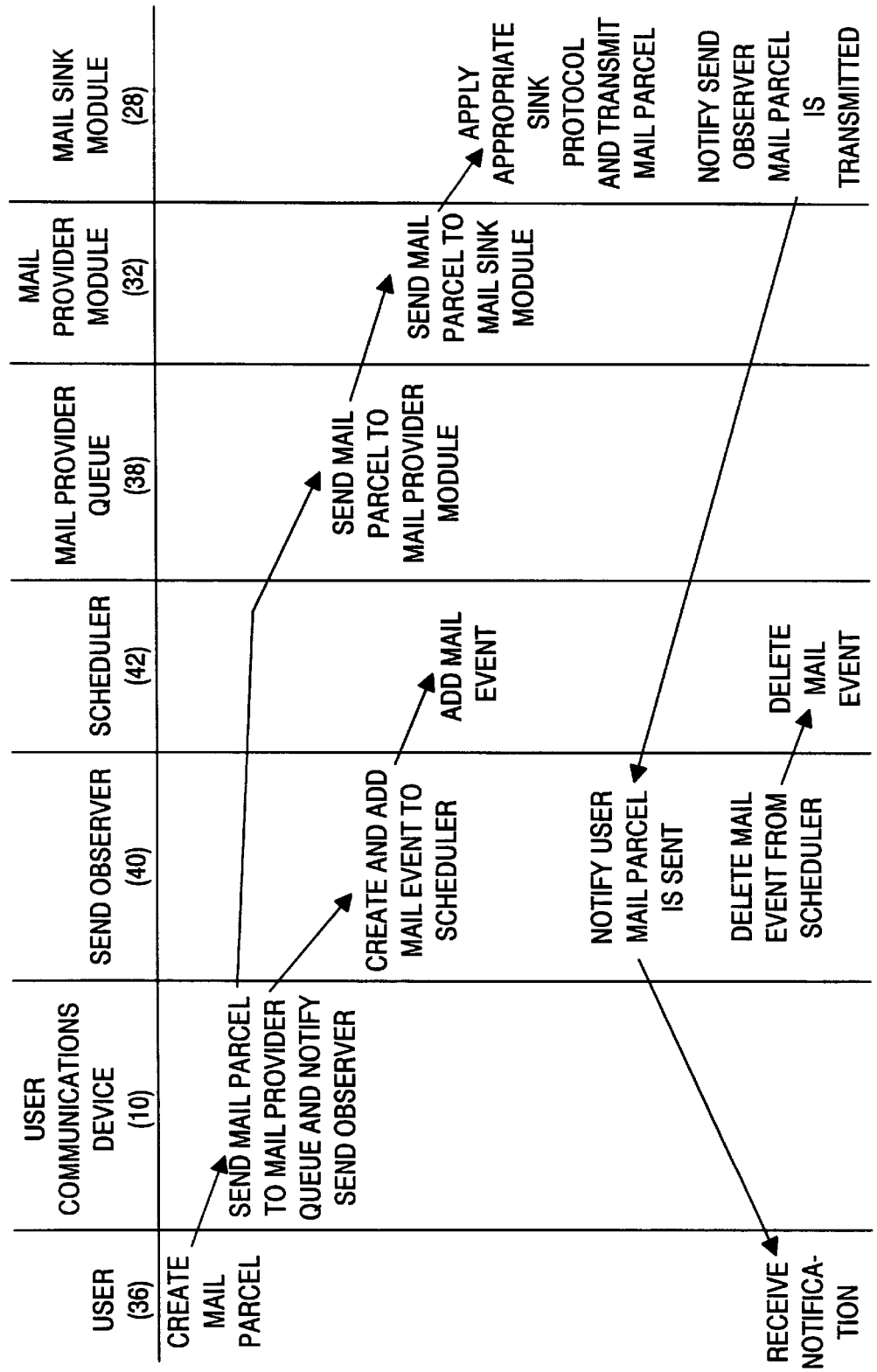
FIG. 3 is a process flow diagram illustrating the method by which the mail provider program transmits electronic mail resources from the user communications device.

A user can transmit his/her electronic business card, hereinafter simply referred to as "business card", as E-mail to various desired companies and/or individuals. The transmission of a business card follows the same steps as illustrated in the process flow diagram of FIG. 3. In creating the mail parcel, i.e., the business card, a user first creates the business card including all of the desired information. The business card is then saved as a mail attachment and sent as an E-mail message with an attachment to the various desired locations.

Receipt of a business card generally follows the same steps as illustrated in the process flow diagram of FIG. 4. The only difference is that instead of the mail provider module 32 simply storing the mail parcel in the mailbox 50, the mail provider module 32 determines if the incoming mail parcel contains a business card, and if so, stores the business card in a business card file 60 (FIG. 7). The business card file 60 is a form of an electronic mail address book.

The business cards, shown generally at 62 in FIG. 7, may include various agents or filters personal to the business card holder. The business card agents or filters may include, but are not limited to, such filters as encryption, decryption, and auto-forwarding. These various agents are utilized by the mail filter module 30 in the receipt and transmission of electronic mail resources.

Figure 8:
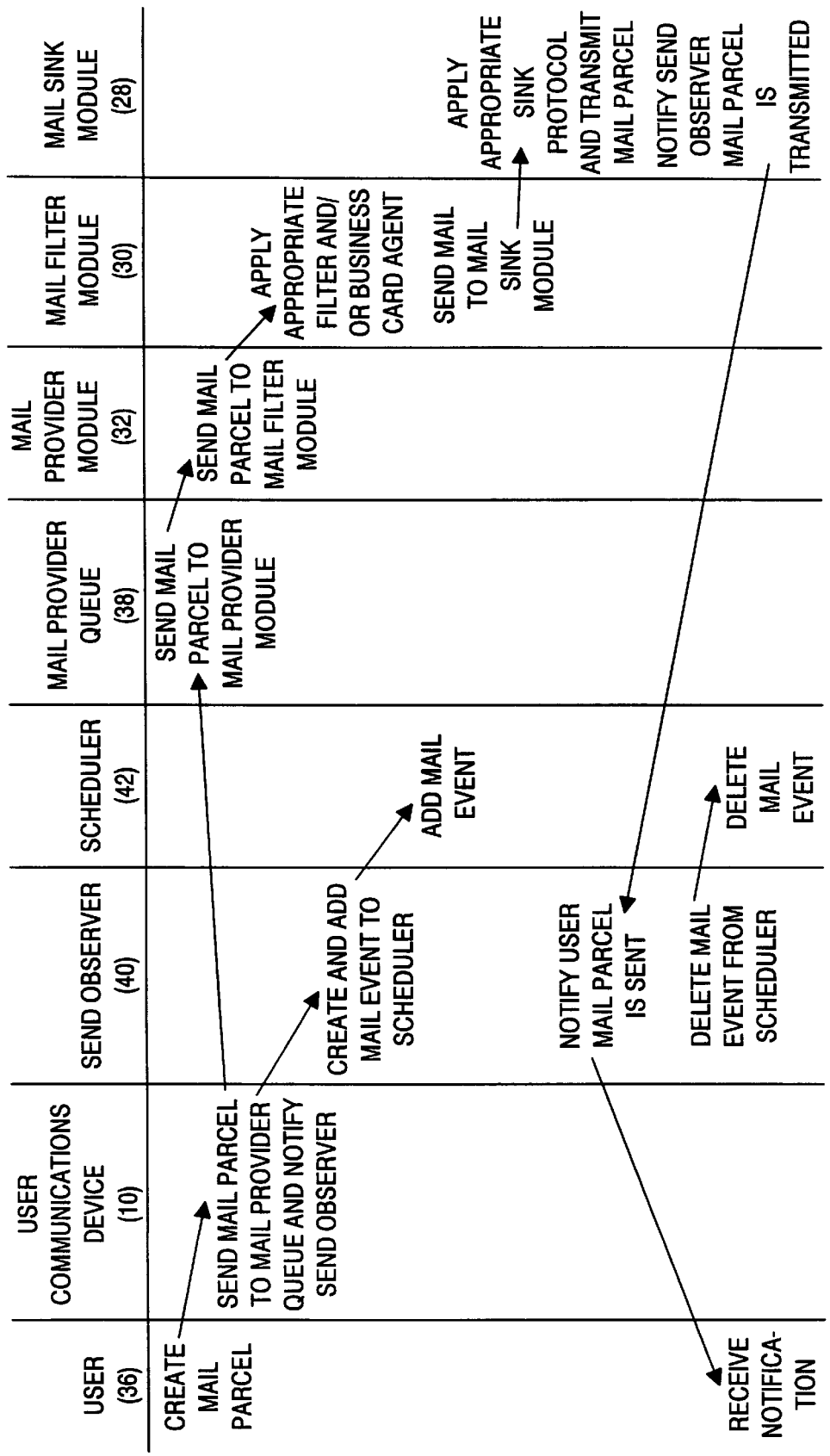
FIG. 8 is a process flow diagram illustrating the method by which the mail provider program utilizes a business card including a business card agent in the transmission of electronic mail resources from the user communications device.

Referring to FIGS. 7 and 8, the utilization of a business card in transmitting electronic mail resources is as follows. The user 36, via the user input device 16 and display 14, generates a mail parcel at the user communications device 10. The user 36 then accesses the business card file 60 and chooses a person, via the business card 62, to whom the mail parcel is destined. The mail parcel is then routed to the mail provider module 32 in the same manner as previously described with respect to FIG. 3. The mail provider module 32 sends the mail parcel to the mail filter module 30. The mail filter module 30 applies the appropriate filter and/or business card agent obtained from the business card 62 in the business card file 60. The mail filter module 30 then sends the outgoing mail parcel to the mail sink module 28, which transmits the outgoing mail parcel in the same manner as previously described with respect to FIG. 3 destined to the stored E-mail address.

Various information may be included in a business card 62 contained in the business card address file 60, the information of which is taken into account by the mail sink module 28 in transmitting the outgoing mail parcel. Such information may include, but is not limited to, the type of mail the addressee wants to receive at that particular time, the address at which the addressee wishes to receive mail at that particular time, etc.

For example, say the business card 62 includes an encryption agent, or "public key", the business card 62 being previously automatically added to the user's business card file 60, along with the other information contained in the business card 62. The public encryption key includes information about which type of cipher, or encryption algorithm, that should be used. Accordingly, when the business card 62 is accessed to transmit mail to the business card holder, the mail filter module 30 recognizes from the business card 62 that the business card holder wishes the mail to be encrypted and applies the appropriate encryption algorithm prior to sending the mail parcel to the mail sink module 28 for transmission thereof.

The business card holder or end recipient presumably has a decryption key, or "private key", for decrypting the received mail parcel. While the public and private keys are mathematically related, the private decryption key cannot be derived from the public encryption key. The encryption key is specific to the business card holder and cannot be changed by the user 36 of the user communications device 10.

Figure 9:
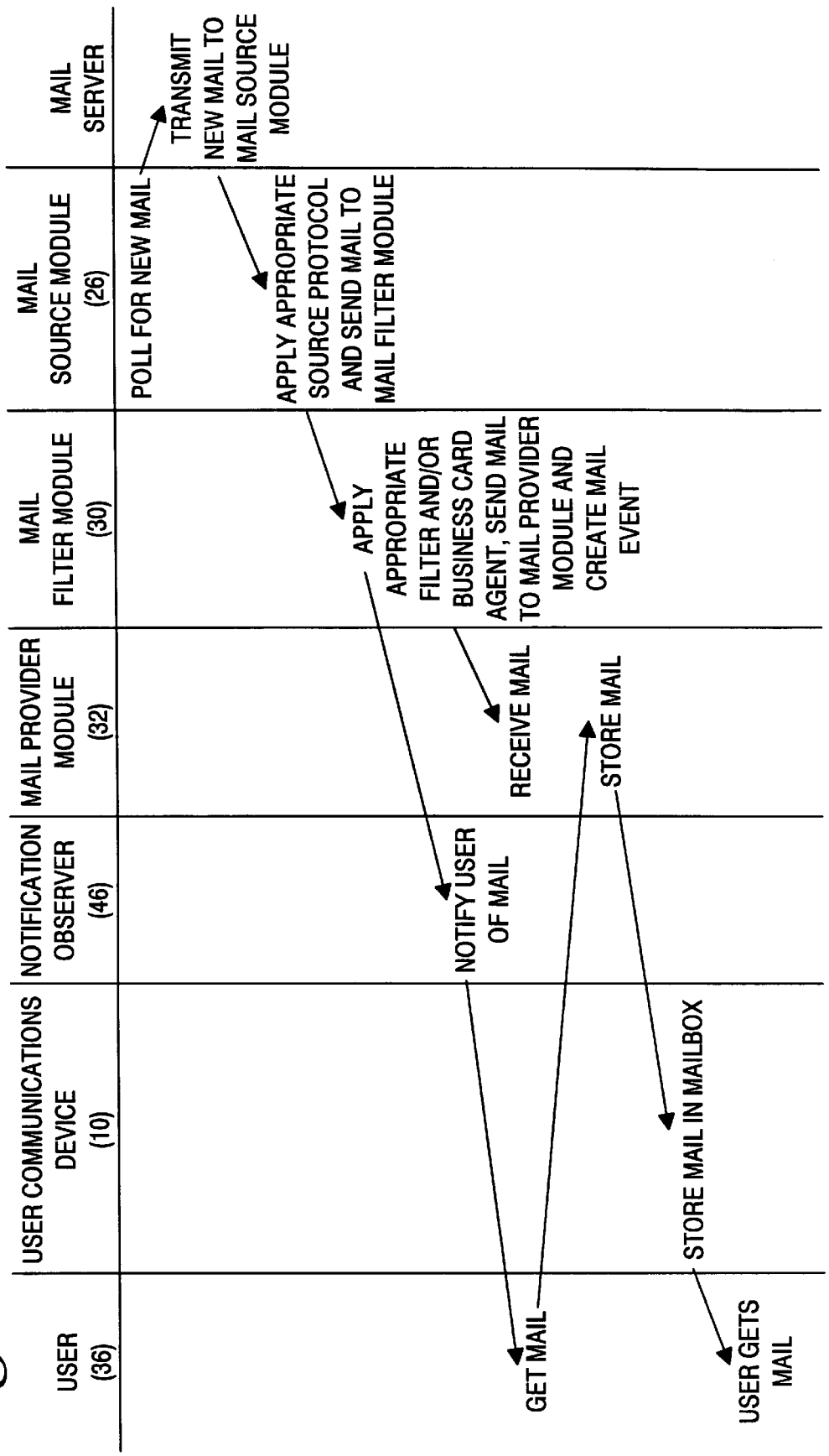
FIG. 9 is a process flow diagram illustrating the method by which the mail provider program utilizes a business card including a business card agent in the receipt of electronic mail resources at the user communications device.

Referring now to FIG. 9, the receipt of a mail parcel requiring application of a business card agent is as follows. The mail source module 26 polls for, retrieves, and sends new mail to the mail filter module 30 in the same manner as previously described with respect to FIG. 4. The mail filter module 30, upon receiving the mail, applies the appropriate filter and/or business card agent. The mail filter module 30 then sends the new mail to the mail provider module 32 in the same manner as previously described with respect to FIG. 4.

As an example, say that the incoming mail parcel is being received from a sender whose business card 62 is stored in the business card file 60, and who, for whatever reasons, encrypts all messages sent. The sender's business card 62 would contain a decryption business card agent so that the incoming encrypted mail parcel could be deciphered and understood by the user 36. Accordingly, the mail filter module 30 applies the decryption business card agent included in the business card 62 of the sender to decrypt the incoming mail parcel.

Further, the present invention permits a business card holder whose business card 62 is stored in the business card file 60 of the user communications device 10 to update his/her business card 62. The business card holder transmits an updated business card 62a, via E-mail, to the user communications device 10. The updated business card 62a is stored in the business card file 60 and becomes the new business card 62a for that particular business card holder. Updating a business card is particularly useful when a business card holder knows that he/she will be at a different address than that indicated on the original business card 62, and wishes mail to be sent to the different address. The business card holder simply transmits an updated business card 62a with a new address to the user communications device 10. Accordingly, all mail sent to the business card holder, via the updated business card 62a, would be automatically forwarded to the updated address.

While the invention has been described with particular reference to the drawings, it should be understood that various modifications could be made without departing from the spirit and scope of the present invention.

What is claimed is:

1. In a user communications device having a processor controlling a display and a user input device, and a communications terminal for transmitting and receiving electronic mail, a messaging application comprising:

a mail provider program operated by the processor, the mail provider program including
a mail provider module for automatically controlling the transmittal and/or receipt of electronic mail by a user accessing the display and user input device,
a mail source module operatively associated with the mail provider module for receiving incoming electronic mail, the mail source module including a plurality of mail source protocols each associated with a different mail service provider, the mail source module automatically (a) selecting one of the mail source protocols based on the mail service provider from which the incoming electronic mail is received, (b) applying the selected mail source protocol to the incoming electronic mail, and (c) forwarding the incoming electronic mail to the mail provider module, and a mail sink module operatively associated with the mail provider module for transmitting outgoing electronic mail, the mail sink module including a plurality of mail sink protocols each associated with a different mail service provider, the mail sink module automatically (a) selecting one of the mail sink protocols based on select criteria associated with the different mail service providers, (b) applying the selected mail sink protocol to the outgoing electronic mail, and (c) transmitting the outgoing electronic mail to a predetermined address.

2. The messaging application of claim 1, wherein said mail sink module transmits the outgoing electronic mail to the predetermined address via the communications terminal and transmits a notification signal to a user that the outgoing electronic mail has been transmitted.

3. The messaging application of claim 1, wherein said mail source module transmits the incoming electronic mail to the processor via the mail provider module and transmits a notification signal to a user that the incoming electronic mail has been received.

4. The messaging application of claim 1, wherein said mail provider program further comprises:

a mail filter module operatively associated with the mail provider module including a plurality of distinct mail filters, the mail filter module (a) determining which, if any, of the plurality of distinct mail filters should be applied to the electronic mail, and (b) applying the determined mail filter, if any, to the electronic mail.

5. The messaging application of claim 4, wherein the predetermined address comprises an address accessed via a business card stored in the processor, and the determined mail filter comprises a business card agent previously stored in the mail filter module upon receipt of the business card including the business card agent by the user communications device.

6. The messaging application of claim 4, wherein the plurality of distinct mail filters are selected from the group consisting of encryption, decryption and auto-forwarding.

7. The messaging application of claim 1, where the mail source module comprises:

a mail source operatively associated with the mail provider module; and a mail source protocol handler operatively associated with the mail source for receiving incoming electronic mail, the mail source protocol handler including the plurality of mail source protocols each associated with a different mail service provider, the mail source protocol handler selecting one of the mail source protocols based on the mail service provider from which the electronic mail is received.

8. The messaging application of claim 1, wherein the mail sink module comprises:

a mail sink protocol handler operatively associated with the mail provider module for transmitting outgoing electronic mail, the mail sink protocol handler including the plurality of mail sink protocols each associated with a different mail service provider, the mail sink protocol handler selecting one of the mail sink protocols based on the select criteria; and a mail sink operatively associated with the mail sink protocol handler receiving the outgoing electronic mail with the selected mail sink protocol and transmitting the outgoing electronic mail to the predetermined address.

9. The messaging application of claim 1, wherein the select criteria are selected from the group consisting of (a) type of the outgoing electronic mail, (b) availability of each of the different mail service providers, (c) traffic on each of the different mail service providers, and (d) cost of transmitting the outgoing electronic mail on each of the different mail service providers.

10. The messaging application of claim 9, wherein the type of the outgoing electronic mail is selected from the group consisting of E-mail, fax mail and voice mail.

11. A method of automatically controlling the receipt of electronic mail messages from a plurality of different mail service providers by a user communications device, said method comprising the steps of:

storing a plurality of mail source protocols, each associated with a different mail service provider, in the user communications device;

operating the user communications device to retrieve mail from the plurality of different mail service providers;

automatically periodically polling the plurality of different mail service providers for electronic mail messages;

upon detecting an electronic mail message destined to the user communications device at one of the plurality of different mail service providers, automatically retrieving the electronic mail message from said one of the plurality of different mail service providers;

upon receiving the electronic mail message at the user communications device, automatically determining from which of the plurality of mail service providers the electronic mail message was received;

automatically selecting a mail source protocol associated with the mail service provider from which the electronic mail message was received;

automatically processing the electronic mail message with the selected mail source protocol; and automatically storing the processed electronic mail message at a location in the user communications device accessible to a user thereof.

12. The method of claim 11, further comprising the steps of:

analyzing the received electronic mail message;

determining which of a plurality of mail filters, if any, should be applied to the received electronic mail message; and applying an appropriate mail filter to the received electronic mail message.

13. The method of claim 12, wherein the applied mail filter comprises a business card agent previously stored in the user communications device upon receipt of a business card including the business card agent by the user communications device.

14. The method of claim 11, wherein the step of polling the plurality of different mail service providers for electronic mail messages comprises the steps of:

receiving a command at the user communications device to retrieve E-mail;

polling a plurality of mail servers utilized by the plurality of mail service providers with which the user has an account for electronic mail messages; and retrieving electronic mail messages addressed to the user from the plurality of mail servers.

15. A method of automatically controlling the transmittal of electronic mail messages via a plurality of mail service providers by a user communications device, said method comprising the steps of:

storing a plurality of mail sink protocols, each associated with a different mail service provider with which a user has an account, in the user communications device;

creating an electronic mail message at the user communications device destined to a selected address;

analyzing the plurality of mail service providers;

determining which of the mail service providers should be used to transmit the electronic mail message based on select criteria associated with the mail service providers;

retrieving a mail sink protocol associated with the selected mail service provider;

processing the electronic mail message with the selected mail sink protocol; and transmitting the processed electronic mail message to the selected address via the selected mail service provider.

16. The method of claim 15, further comprising the steps of:

analyzing the generated electronic mail message;

determining which of a plurality of mail filters, if any, should be applied to the generated electronic mail message; and applying an appropriate mail filter to the generated electronic mail message prior to transmission.

17. The method of claim 16, wherein
the selected address comprises an address provided in a business card stored in the user communications device, and the appropriate mail filter comprises a business card agent associated with the business card.

18. The method of claim 17, wherein storing the business card agent in the user communications device comprises the steps of:

receiving a business card including a business card agent at the user communications device;

locating the business card agent in the business card;

assigning a mail filter to the business card agent; and storing the business card at an appropriate address in the user communications device accessible by a user thereof.

19. The method of claim 15, wherein the select criteria are selected from the group consisting of (a) type of the outgoing electronic mail message, (b) availability of each of the different mail service providers, (c) traffic on each of the different mail service providers, and (d) cost of transmitting the outgoing electronic mail message on each of the different mail service providers.

20. The method of claim 19, wherein the type of the outgoing electronic mail message is selected from the group consisting of E-mail, fax mail and voice mail.

* * * * *